United States Patent [19]
Kawaguchi et al.

[11] Patent Number: 5,680,830
[45] Date of Patent: Oct. 28, 1997

[54] EXCREMENT TREATMENT FOR SMALL ANIMALS AND METHOD OF MANUFACTURING THE SAME

[75] Inventors: Yuji Kawaguchi, Matsudo; Masai Sato, Hitachiota; Takashi Koyama, Saitama-ken, all of Japan

[73] Assignee: Kunimine Industries Co., Ltd., Tokyo, Japan

[21] Appl. No.: 519,929

[22] Filed: Aug. 28, 1995

[30] Foreign Application Priority Data

Sep. 2, 1994 [JP] Japan .................................. 6-232525

[51] Int. Cl.$^6$ ....................................... A01K 29/00
[52] U.S. Cl. ........................................ 119/172; 119/173
[58] Field of Search ................................ 119/171, 172, 119/173, 526; 428/402, 454; 502/62, 80, 412

[56] References Cited

U.S. PATENT DOCUMENTS

| | | |
|---|---|---|
| 3,256,857 | 6/1966 | Karras . |
| 4,163,674 | 8/1979 | Been ........................ 119/173 |
| 4,625,679 | 12/1986 | Hill . |
| 5,229,348 | 7/1993 | Ivie ......................... 119/173 |
| 5,279,259 | 1/1994 | Rice et al. . |
| 5,402,752 | 4/1995 | Hahn et al. ................. 502/80 |
| 5,450,817 | 9/1995 | Hahn et al. ................. 119/173 |

FOREIGN PATENT DOCUMENTS

| | | |
|---|---|---|
| 0 087 001 | 8/1983 | European Pat. Off. . |
| 61-67423 | 4/1986 | Japan . |
| 62-221444 | 9/1987 | Japan . |
| 6-90633 | 4/1994 | Japan . |
| 8304094 | 6/1983 | Netherlands ............. 119/172 |
| WO 91/06210 | 5/1991 | WIPO . |

*Primary Examiner*—Todd E. Manahan
*Attorney, Agent, or Firm*—Birch, Stewart, Kolasch & Birch, LLP

[57] ABSTRACT

There is disclosed an excrement treatment for small animals made up of small pieces containing bentonite and, if desired, wood powder or paper powder being formed in a shape of thin flat plates or waved plates, wherein the thickness of the small pieces of the excrement treatment is from 0.1 to 2 mm, and the average aspect ratio of the treatment is from 3 to 50; and a method of manufacturing the treatment. According to the treatment, making an excrement-incorporated mass small and solid, enabling a small amount of the litter to be discarded, and permitting the toilet for small animals to be made compact, can be done.

13 Claims, 2 Drawing Sheets

EXCREMENT TREATMENT FOR SMALL ANIMALS AND METHOD OF MANUFACTURING THE SAME

FIELD OF THE INVENTION

The present invention relates to a material for treating excrement of small animals and to a method of manufacturing the material.

BACKGROUND OF THE INVENTION

An excrement treatment for small animals, such as pets represented by cats, is generally called "cat litter." Cat litter can be divided roughly into two types: so-called solidifyable cat litter, which is disposable and uses bentonite to absorb excrement to form a mass; and so-called washable cat litter, which uses zeolite, which absorbs excrement but resists forming a mass and which enables absorbed excrements to be washed out with water, allowing the cat litter to be reused after it has dried. The conventional solidifyable cat litter is generally in the form of particles or pellets of bentonite or the like.

After the litter particles of the aforementioned conventional solidifyable cat litter absorb excrement, such as urine, they combine together to form a mass, so that the solidifyable cat litter is advantageous in that it is relatively easy to remove the excrement. However, since the excrement form a mass that includes a considerable amount of the litter, the amount of the cat litter to be discarded becomes large, which is not economical. Further, since excrement easily permeate the absorber, the excrement-absorbed mass becomes elongated, particularly in the vertical plane (depth of the litter), resulting in much non-functional space in the litter container. Therefore there is a problem that the litter tray or toilet for small animals containing the cat litter must be of a relatively large size.

SUMMARY OF THE INVENTION

Taking the above problems into account, an object of the present invention is to provide an excrement treatment for small animals that results in a small mass of efficiently absorbed and embraced excrement; that enables a small amount of the cat litter to be discarded; and that permits the cat tray or toilet for small animals to be made compact.

Another object of the present invention is to provide a method of manufacturing the said excrement treatment.

Other and further objects, features, and advantages of the invention will appear more evident from the following description, taken in connection with the accompanying drawing.

DETAILED DESCRIPTION OF THE INVENTION

Figure 1:
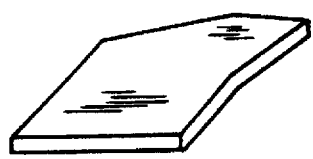
FIG. 1 is a perspective-enlarged view of an example of the shape of Sample 2 of an excrement treatment according to the present invention.

Taking the above object into account, the present inventors have studied in various ways. As a result, we have found that, by forming the small pieces of an excrement treatment for small animals not into simple particles or the like but into thin flat plates or waved plates having a specified average aspect ratio, the permeation speed of excrement in the treatment is lowered, the amount of litter to be used can be made small, and the solidifying strength of the formed mass can be improved. The present invention has been accomplished based on these findings.

That is, the present invention provides:

(1) An excrement treatment for small animals made up of small pieces containing bentonite being formed in a shape of thin flat plates or waved plates, wherein the thickness of the small pieces of said excrement treatment is in the range of from 0.1 to 2 mm, and wherein the average aspect ratio of said excrement treatment is in the range of from 3 to 50.

(2) The excrement treatment for small animals as stated in the above (1), wherein the thickness of the small pieces of said excrement treatment is in the range of from 0.4 to 1 mm.

(3) The excrement treatment for small animals as stated in the above (1) or (2), wherein the average aspect ratio of said excrement treatment is in the range of from 5 to 20.

Now the present invention will be described in detail.

The excrement treatment for small animals of the present invention is characterized by making small the amount of litter required for absorbing and embracing excrement (urine and droppings) excreted from small animals, such as a cat.

In the present specification, "treating of excrement" means absorbing and embracing (incorporating) excrement with litter particles, to make an excrement-absorbed mass. This resultant mass can be easily removed from litter particles that are not polluted with excrement.

In the present invention, in order to make the mass that has absorbed and embraced excrement smaller than the conventional case, the space between the small pieces of the treatment is minimized and the surface area of the small pieces of the treatment is made large per unit area. To meet these conditions, in the present invention, the small pieces of the treatment are formed into the shape of flat plates or waved plates; the thickness of the small pieces of the treatment is 0.1 to 2 mm, and the average aspect ratio (the average value obtained by dividing the diameter of a circle corresponding to the projected area of the main plane of a small piece of the treatment, by the thickness of the small piece of the treatment) is from 3 to 50. The particularly preferable dimensions of the small pieces of the treatment are thickness, 0.4 to 1 mm, and average aspect ratio, 5 to 20. In this case, if the thickness of the small pieces is over 2 mm, the solidifying bonding strength when urine or the like is absorbed is not satisfactory. Further, if the thickness of the small pieces is over 2.5 mm, solidification and bonding hardly occur.

Where the excrement treatment of the present invention, made up of small pieces in the shape of thin flat plates or waved plates having a specified thickness and a specified aspect ratio, is placed in a cat tray, the small pieces lie in layers horizontally. Therefore, excrement (urine) does not proceed (penetrate) straight downward through spaces among the small pieces; rather it first flows horizontally between the layers, and then downward; that is, it flows in a zigzag pattern. As a result, the course of the passage becomes considerably long and the excrement and small pieces come in close contact with each other over a satisfactory period of time. Thus, the treatment can satisfactorily absorb the excrement, and a small amount of the treatment can absorb the excrement satisfactorily to form a mass. Therefore, the weight of the solidified mass can be small. Further, since the small pieces are in the shape of thin flat plates or waved plates, when the small pieces are bonded together with the urine, they are secured with the surfaces in contact with each other, and advantageously the solidifying bonding strength between the small pieces of the mass is remarkably high, resulting in a firm mass. In addition, considering the specific gravity, the excrement treatment has low fly loss and is cracked or pulverized less.

In the present invention, the material of the treatment is made up of mainly bentonite, and most preferably 100% of the material is bentonite; but, as needed, other component such as a sodium compound, a magnesium compound, zeolite, wood powder, paper powder, or the like may be mixed with bentonite, if it can absorb and embrace excrements to form a mass.

When bentonite is mixed with some other component, preferably the amount of the bentonite is 20% by weight or more, and more preferably 30% by weight or more. Preferably the component to be mixed with bentonite is wood powder or paper powder. The amount of the wood powder is preferably 1 to 80% by weight, and more preferably 30 to 70% by weight. The amount of the paper powder is preferably 1 to 80% by weight, and more preferably 3 to 60% by weight.

The reason for adding, in addition to bentonite, another component, i.e., wood powder or paper powder, includes the following:

(1) Wood powder and paper powder are light materials, and when they are mixed with bentonite the excrement treatment can be made light in weight.

(2) Wood powder and paper powder are materials that can be burned, and when the used treatment to which wood powder or paper powder has been added is burned, the volume of the waste resulting from after the burning will be reduced.

(3) As wood powder, such waste material as sawdust can be utilized effectively; that is, a material that is otherwise discarded as a waste material can be recycled and reused.

(4) Paper powder is generally white in color, and when it is added to the treatment of the present invention, the image of the treatment as a commodity can be made very favorable. Further, since paper powder is fibrous, it can make up for the brittleness and frailness of clay (bentonite) and can supplement the stiffness (nerve) of clay. In this regard, the same can be said of wood powder, if it is added in a large amount.

(5) When wood powder or paper powder is added to bentonite, the resulting cat litter is further improved in water absorbability.

Preferably the excrement treatment of the present invention is molded by a wet-molding process. Other procedures of the molding will follow those of the conventional molding process using a usual molding apparatus.

The method of manufacturing the excrement treatment of the present invention will now be described below in detail.

First, bentonite, water, and, if necessary, another component, such as wood powder and paper powder, are placed and mixed in a mixer. Preferably the amount of water is 10 to 80 parts by weight, and more preferably 15 to 70 parts by weight, per 100 parts by weight of bentonite, and the amount of paper powder or wood powder is as prescribed above. After the mixing, the mixture is spread by using a roll, preferably a three-roll, into a sheet preferably of thickness 0.1 to 2 mm, and more preferably 0.4 to 1 mm. The sheet is placed in a dryer, and after drying it, preferably at 90 to 500° C. for 0.5 to 1 hour, the sheet is broken into small pieces, and the pieces are sieved through a sifting machine, to obtain an excrement treatment for small animals that is in the form of thin flat plates or waved plates having a prescribed aspect ratio.

In comparison with the conventional treatment made up of particles, in the small pieces of the excrement treatment for small animals of the present invention, the spaces among the small pieces of the treatment are less and the surface area per unit area of the small pieces of the treatment is large. Therefore, excrement can be absorbed efficiently and the mass embracing the excrement can be made small, and as a result the amount of the litter to be discarded can be made small. Further, since the solidification and bonding of the mass is firm, there is an excellent effect that when the mass is discarded, it hardly crumbles and can be easily handled.

According to the present invention, the treatment can absorbs excrement satisfactorily, and the mass that has absorbed and embraced the excrement becomes small and thin, so that the cat tray or toilet for small animals can be made compact.

EXAMPLE

The present invention will now be described with reference to the following examples, which do not restrict the present invention. Hereinafter, part(s) means weight part(s).

Examples 1 and 2

To 100 parts of bentonite, manufactured by Kunimine Industries Co., Ltd. (available under the trade name KUNIBOND), 25 parts of water was added; they were mixed by a planetary mixer; the mixture was spread by a three-roll into a sheet of 0.8 mm thickness; the sheet was dried in a box-type drier and was crushed into pieces; the pieces were passed through screens, and pieces that passed through 4-mesh screen (opening: 4.76 mm) and then remained on 12-mesh screen (opening: 1.4 mm) were obtained as Sample 1. Hereinafter, sizes of mesh are those defined by Tyler standard sieve. The average aspect ratio of Sample 1, which ratio was obtained by using the said diameter of the circle corresponding to the projected area of the main plain, was 6.8 (the average aspect ratio by an informal method which was obtained by dividing the length of the major axis by the thickness of a small piece of the sample, was 7).

To 100 parts of bentonite, manufactured by Kunimine Industries Co., Ltd. (available under the trade name KUNIBOND), 28 parts of water was added; they were mixed by a batch kneader; the mixture was spread by a three-roll into a sheet of 0.4 mm thickness; the sheet was dried in a box-type drier and was crushed into pieces; the pieces were passed through screens, and pieces that passed through 4-mesh screen (opening: 4.76 mm) and then remained on 16-mesh screen (opening: 1 mm) were obtained as Sample 2. An enlarged perspective view of a representative piece of the pieces is shown in FIG. 1. The average aspect ratio of Sample 2 was 11.9 (the average aspect ratio by the informal method was 12).

Figure 2:
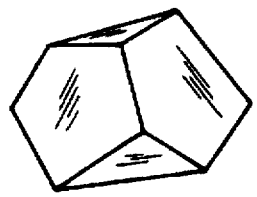
FIG. 2 is a perspective-enlarged view of an example of the shape of a commercially available product A of an example of a conventional excrement treatment.
Figure 3:
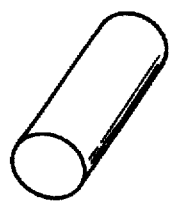
FIG. 3 is a perspective-enlarged view of an example of the shape of a commercially available product B of an example of a conventional excrement treatment.
Figure 4:
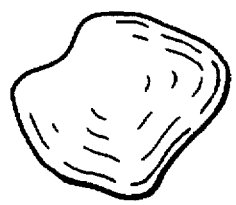
FIG. 4 is a perspective-enlarged view of an example of the shape of a commercially available product C of an example of a conventional excrement treatment.

For comparison with Samples 1 and 2, three commercially available bentonites of different shape, as cat litter, were chosen and named Commercially Available Product A (broken particles), Commercially Available Product B (extruded granules), and Commercially Available Product C (tumbled granules), which are shown perspectively in FIGS. 2 to 4 on an enlarged scale. With respect to these five samples, the following performance tests were carried out.
(Solidity Test)

Figure 5:
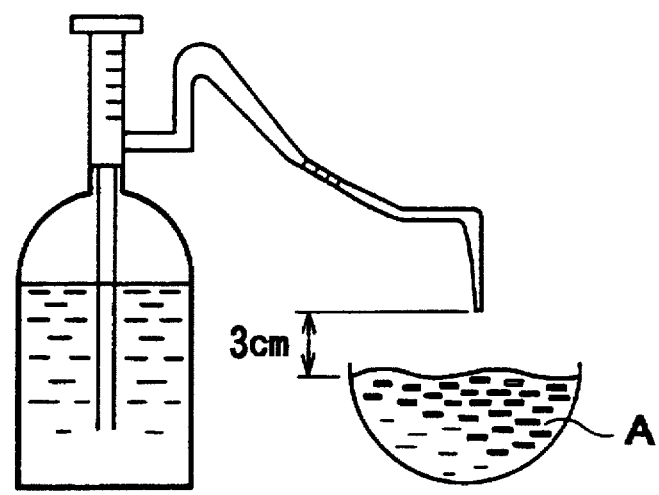
FIG. 5 is a schematic view of an apparatus for measuring the strength of a mass for the performance test.
Figure 6:
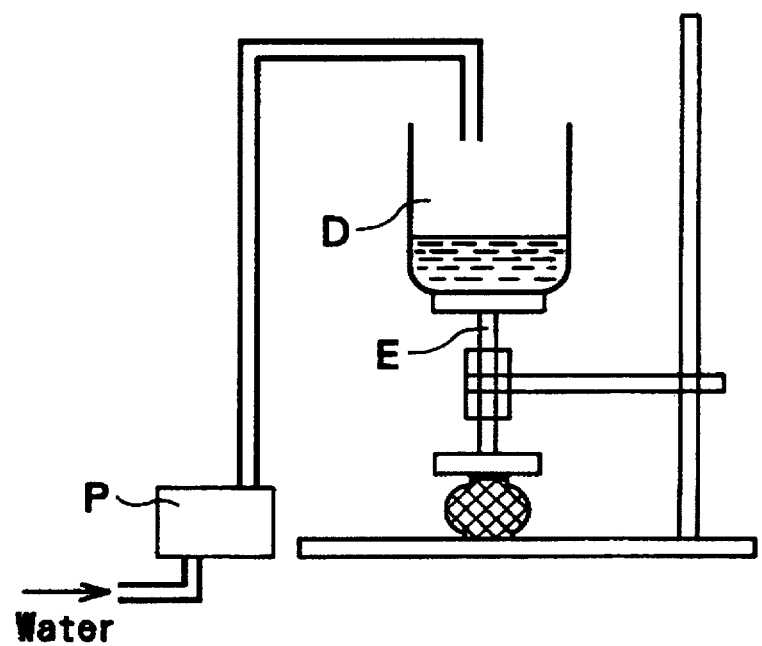
FIG. 6 is a schematic view of an apparatus for measuring the strength of a mass for the performance test.

In a bowl A, 1 kg of the sample was placed. Thereinto, 20 ml of 2% table-salt water was poured, from an apparatus shown in FIG. 5 (the nozzle was adjusted so that 20 ml of the table-salt water would flow out in 5 sec, by using a reburette, made by Shibata K.K.). About 30 sec after the pouring, the part of the bentonite that had absorbed the table-salt water was taken out by hand, and after 1 min, water was introduced into a container D, at a rate of about 4 liters per min, from an apparatus shown in FIG. 6. At that time, the bentonite mass was closely observed, and the point when the mass was cracked or collapsed was judged as the end point, and the switch of the pump P was turned off. The weight of the container D holding the water, and the weight of the piston E, were combined, and the obtained value was designated the solidity (g).
(Weight Test)

Similar to the solidity test, 20 ml of 2% table-salt water was poured to the sample, and after about 30 sec, the formed mass was taken out, and the weight (g) of the mass was measured.
(Permeability)

Similar to the solidity test, 20 ml of 2% table-salt water was poured to the sample; then after about 30 sec, the formed mass was taken out, and the diameter D (mm) and the height H (mm) thereof were measured. The permeability was found in accordance with the following formula:

Permeability (%)=(H/D)×100

The results of the measurement of these performance tests are shown in Table 1.

As is apparent from the results in Table 1, it can be understood that the amount of the cat litter of the present invention, used for solidifying 20 ml of 2% table-salt water, are about ½ amount of that of the commercially available bentonite product. Therefore, when the excrement treatment of the present invention absorbs and embraces excrement, the size of the mass that has absorbed and embraced the excrement is smaller than that of the conventional case, and the amount of the litter to be discarded is reduced. The sample of the present invention is also excellent in the solidity of the mass. Also, it can be understood that, since the permeability is about ⅓ of that of the commercially available bentonite products, the permeation of excrement in the treatment is suppressed and a mass is formed that is far thinner than that obtained by conventional bentonite products.

Comparative Example 1

To 100 parts of bentonite, manufactured by Kunimine Industries Co., Ltd. (available under the trade name KUNIBOND), 28 parts of water was added; they were mixed by a mixer; the mixture was spread by a three-roll into a sheet of 2.5 mm thickness; the sheet was dried in a box-type drier and was crushed into pieces; the pieces were passed through screens, and pieces that passed through 3.5-mesh screen (opening: 5.66 mm) and then remained on 16-mesh screen (opening: 1 mm) were obtained as a sample. The average aspect ratio of the sample was 3.6 (the average aspect ratio by the informal method was 4).

This sample was subjected to the same tests that were conducted in Example 1. The results are shown in Table 1.

Comparative Example 2

To 100 parts of bentonite, manufactured by Kunimine Industries Co., Ltd. (available under the trade name KUNIBOND), 28 parts of water was added; they were mixed by a mixer; the mixture was spread by a three-roll into a sheet of 0.8 mm thickness; the sheet was dried in a box-type drier and was crushed into pieces; the pieces were passed through screens, and pieces that passed through 16-mesh screen (opening: 1 mm) and then remained on 20-mesh screen (opening: 0.84 mm) were obtained as a sample. The average aspect ratio of the sample was 1.8 (the average aspect ratio by the informal method was 2).

This sample was subjected to the same tests that were conducted in Example 1. The results are shown in Table 1.

TABLE 1

| | Amount of litter required to solidify 20 ml of 2% sodium chloride (g) | Permeability (%) | Solidity (g) | Remarks |
| --- | --- | --- | --- | --- |
| Example 1 (Sample 1) | 21.2 | 46.5 | 780 | This Invention |
| Example 2 (Sample 2) | 20.3 | 45.8 | 720 | This Invention |
| Commercially Available Product A (bentonite broken particles) | 53.3 | 140 | 597 | Comparative Example |
| Commercially Available Product B (bentonite extruded granules) | 43.0 | 159 | 560 | Comparative Example |
| Commercially Available Product C (bentonite tumbled granules) | 39.8 | 123 | 605 | Comparative Example |
| Comparative Example 1 | not solidified | — | — | Comparative Example |
| Comparative Example 2 | 35.6 | 82.3 | 410 | Comparative Example |

Example 3 and Comparative Example 3

To 100 parts of bentonite, manufactured by Kunimine Industries Co., Ltd. (available under the trade name NEOKUNIBOND), 25 parts of wood powder and 40 parts of water were added; they were mixed by a mixing/granulating machine (Spartan.ryuzer, a trade name); the mixture was spread by a three-roll into a sheet of 0.8 mm thickness, and Sample 3 was prepared therefrom in the same manner used in preparing Sample 1. The average aspect ratio of Sample 3 was made the same as that of Sample 1 of Example 1. As Comparative Example 3, the same preparation was extruded by a disk pelleter into granules of 2 mm diameter, to prepare Sample 4. Samples 3 and 4 were subjected to the same performance tests as in Example 1. The results are shown in Table 2.

As is apparent from the results in Table 2, it can be understood that, even if the same material is used, when the small pieces are thin flat plates as defined by the present invention, the amount of the litter used for solidifying 20 ml of 2% table-salt water is reduced to about 70% of the case of the particles comprising conventional extruded granules; the size of the mass that has absorbed and embraced excrements is made smaller than the case wherein the conventional extruded granules are used; and the amount of the litter to be discarded can be made small. It is also understood that, since the permeability is about ½ of the permeability of the conventional products, the permeation of excrements in the treatment is suppressed, and the formed mass is far thinner than that of the conventional products.

Therefore, from the results of Examples 1 to 3 shown above, it can be understood that the small pieces of the excrement treatment of the present invention exhibit an excellent effect in that the mass that has absorbed and embraced excrements is made small, solid, and thin in comparison with the conventional case.

TABLE 2

| | Amount of litter required to solidify 20 ml of 2% sodium chloride (g) | Permeability (%) | Solidity (g) | Remarks |
| --- | --- | --- | --- | --- |
| Example 3 | 34 | 80 | 480 | This Invention |
| Comparative Example 3 | 48 | 165 | 320 | Comparative Example |

Example 4

To 38 parts of bentonite, manufactured by Kunimine Industries Co., Ltd. (available under the trade name NEOKUNIBOND), 46 parts of wood powder, 5 parts of soda ash, 5 parts of methylcellulose, 6 parts of gypsum, and 55 parts of water were added; they were mixed by a ribbon mixer; the mixture was spread by a three-roll into a sheet of 0.6 mm average thickness; the sheet was dried in a rotary dryer and then was crushed into pieces; the pieces were passed through screens, and pieces that passed through 3.5-mesh screen (opening: 5.66 mm) and then remained on 16-mesh screen (opening: 1 mm) were obtained as a sample. The average aspect ratio of the sample was 12.

The sample was subjected to the same tests as in Example 1. The results are shown in Table 3.

Example 5

To 90 parts of bentonite, manufactured by Kunimine Industries Co., Ltd. (available under the trade name NEOKUNIBOND), 5 parts of paper powder, 5 parts of activated clay, and 34 parts of water were added; they were mixed by a ribbon mixer; the mixture was spread by a three-roll into a sheet of 0.6 mm average thickness; the sheet was dried in a rotary dryer and crushed into pieces; the pieces were passed through screens, and pieces that passed through 3.5-mesh screen (opening: 5.66 mm) and then remained on 16-mesh screen (opening: 1 mm) were obtained as a sample. The average aspect ratio of the sample was 12.

The sample was subjected to the same tests as in Example 1. The results are shown in Table 3.

TABLE 3

| | Amount of litter required to solidify 20 ml of 2% sodium chloride (g) | Permeability (%) | Solidity (g) | Remarks |
| --- | --- | --- | --- | --- |
| Example 4 | 13 | 50 | 480 | This Invention |
| Comparative Example 5 | 30 | 80 | 700 | Comparative Example |

Having described our invention as related to the present embodiments, it is our intention that the invention not be limited by any of the details of the description, unless otherwise specified, but rather be construed broadly within its spirit and scope as set out in the accompanying claims.

What we claim is:

1. An excrement treatment for small animals made up of small pieces containing bentonite being formed in a shape of thin flat plates or waved plates, wherein the thickness of the small pieces of said excrement treatment is in the range of from 0.1 to 2 mm, and the average aspect ratio of said excrement treatment is in the range of from 3 to 50.

2. The excrement treatment for small animals as claimed in claim 1, wherein the thickness of the small pieces of said excrement treatment is in the range of from 0.4 to 1 mm.

3. The excrement treatment for small animals as claimed in claim 1, wherein the average aspect ratio of said excrement treatment is in the range of from 5 to 20.

4. The excrement treatment for small animals as claimed in claim 1, wherein said pieces further comprise wood powder or paper powder.

5. The excrement treatment for small animals as claimed in claim 4, wherein the thickness of the small pieces of said excrement treatment is in the range of from 0.4 to 1 mm.

6. The excrement treatment for small animals as claimed in claim 4, wherein the average aspect ratio of said excrement treatment is in the range of from 5 to 20.

7. The excrement treatment for small animals as claimed in claim 4, wherein said pieces comprise bentonite and wood powder.

8. The excrement treatment for small animals as claimed in claim 4, wherein said pieces comprise bentonite and paper powder.

9. The excrement treatment for small animals as claimed in claim 4, wherein said pieces comprise bentonite in an amount of 20% by weight or more.

10. The excrement treatment for small animals as claimed in claim 4, wherein said pieces comprise wood powder in an amount of 1 to 80% by weight.

11. The excrement treatment for small animals as claimed in claim 4, wherein said pieces comprise paper powder in an amount of 1 to 80% by weight.

12. A method of manufacturing an excrement treatment for small animals made up of small pieces containing bentonite being formed in a shape of thin flat pates or waved plates, comprising the steps of:

mixing components comprising bentonite and water, spreading the resulting mixture into a shape of a sheet with a prescribed thickness, breaking the sheet into small pieces after drying it, and sieving the small pieces such that the small pieces have a thickness of 0.1 to 2 mm and an average aspect ratio of 3 to 50.

13. The method as claimed in claim 12, wherein wood powder or paper powder is mixed with bentonite and water as a component in the mixing step.

* * * * *